(12) United States Patent
Brichford

(10) Patent No.: US 8,490,117 B1
(45) Date of Patent: Jul. 16, 2013

(54) BRIDGING SCRIPT ENGINES

(75) Inventor: Christopher Brichford, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1617 days.

(21) Appl. No.: 11/773,914

(22) Filed: Jul. 5, 2007

Related U.S. Application Data

(63) Continuation-in-part of application No. 11/585,661, filed on Oct. 23, 2006, now Pat. No. 7,614,003.

(51) Int. Cl.
*G06F 15/163* (2006.01)

(52) U.S. Cl.
USPC ............ 719/328; 719/313; 719/320; 717/115

(58) Field of Classification Search
USPC ............ 719/320, 328, 313; 715/760; 717/115
See application file for complete search history.

(56) References Cited

U.S. PATENT DOCUMENTS

| | | | |
|---|---|---|---|
| 5,511,217 A | 4/1996 | Nakajima et al. | |
| 5,978,584 A | 11/1999 | Nishibata et al. | |
| 6,057,854 A | 5/2000 | Davis et al. | |
| 6,256,772 B1 * | 7/2001 | Apte et al. | 717/100 |
| 6,415,278 B1 | 7/2002 | Sweet et al. | |
| 6,552,732 B1 | 4/2003 | Davis et al. | |
| 6,558,431 B1 | 5/2003 | Lynch et al. | |
| 6,609,158 B1 * | 8/2003 | Nevarez et al. | 719/316 |
| 6,658,600 B1 | 12/2003 | Hogdal et al. | |
| 6,675,230 B1 * | 1/2004 | Lewallen | 719/328 |
| 6,687,745 B1 | 2/2004 | Franco et al. | |
| 6,691,176 B1 * | 2/2004 | Narin et al. | 719/318 |
| 6,779,172 B1 | 8/2004 | Weerawarana et al. | |
| 6,801,224 B1 | 10/2004 | Lewallen et al. | |
| 6,812,941 B1 | 11/2004 | Brown et al. | |
| 6,873,343 B2 | 3/2005 | Zhang | |
| 6,892,200 B2 | 5/2005 | Eich | |
| 6,898,786 B1 | 5/2005 | Sokolov | |
| 6,922,200 B1 | 7/2005 | Marques | |
| 7,058,955 B2 | 6/2006 | Porkka | |
| 7,088,374 B2 | 8/2006 | David et al. | |
| 7,103,585 B2 | 9/2006 | Jowell et al. | |

(Continued)

OTHER PUBLICATIONS

Lott, J.; Schall, D.; Peters, K., "ActionScript 3.0 Cookbook", (Oct. 11, 2006), O'Reilly Media, Inc., pp. 494-498 [retrieved from http://academic.safaribooksonline.com/book/programming/actionscript/0596526954 on Oct. 27, 2011].*

(Continued)

*Primary Examiner* — S. Sough
*Assistant Examiner* — Brian Wathen
(74) *Attorney, Agent, or Firm* — Schwegman, Lundberg & Woessner, P.A.

(57) ABSTRACT

Methods, systems, and apparatus, including medium-encoded computer program products, for bridging script engines. In one aspect, a method includes providing a first script engine to interpret scripts of a first script type; providing a second script engine to interpret scripts of a second script type; and bridging between the first script engine and the second script engine, wherein the bridging includes sharing identifiers defined for the first script engine with the second script engine, the sharing allowing scripts in the first script engine to refer to identifiers defined for the second script engine and scripts in the second script engine to refer to identifiers defined for the first script engine.

34 Claims, 8 Drawing Sheets

U.S. PATENT DOCUMENTS

| | | | |
|---|---|---|---|
| 7,117,504 | B2 | 10/2006 | Smith et al. |
| 7,158,878 | B2 | 1/2007 | Rasmussen et al. |
| 7,161,599 | B2 | 1/2007 | Beda et al. |
| 7,210,095 | B1 | 4/2007 | Mor |
| 7,257,771 | B2 | 8/2007 | Buser et al. |
| 7,265,756 | B2 | 9/2007 | Schneider et al. |
| 7,287,274 | B1 | 10/2007 | Houlding |
| 7,340,718 | B2 | 3/2008 | Szladovics et al. |
| 7,346,897 | B2 | 3/2008 | Vargas |
| 7,430,343 | B2 | 9/2008 | Hayes et al. |
| 7,486,294 | B2 | 2/2009 | Beda et al. |
| 7,546,607 | B2 | 6/2009 | Demsey et al. |
| 7,614,003 | B2 | 11/2009 | Brichford et al. |
| 7,823,164 | B2 | 10/2010 | Gibbs et al. |
| 7,958,457 | B1 | 6/2011 | Brandenberg et al. |
| 7,971,194 | B1 | 6/2011 | Gilboa |
| 8,020,089 | B1 | 9/2011 | Brichford et al. |
| 2001/0032221 | A1 | 10/2001 | Anwar |
| 2002/0109729 | A1 | 8/2002 | Dutta |
| 2002/0120918 | A1 | 8/2002 | Aizenbud-Reshef et al. |
| 2002/0156881 | A1 | 10/2002 | Klopp Lemon et al. |
| 2002/0178141 | A1* | 11/2002 | Kushnirskiy ............... 707/1 |
| 2003/0097421 | A1 | 5/2003 | Wille et al. |
| 2003/0101235 | A1 | 5/2003 | Zhang |
| 2003/0105883 | A1* | 6/2003 | Gibbons ............... 709/313 |
| 2003/0121000 | A1 | 6/2003 | Cooper et al. |
| 2003/0126311 | A1* | 7/2003 | Kushnirskiy et al. ......... 709/328 |
| 2003/0217086 | A1* | 11/2003 | Kushnirskiy et al. ............. 709/1 |
| 2004/0015940 | A1 | 1/2004 | Heisey et al. |
| 2004/0098731 | A1 | 5/2004 | Demsey et al. |
| 2004/0111672 | A1 | 6/2004 | Bowman et al. |
| 2004/0111673 | A1 | 6/2004 | Bowman et al. |
| 2004/0189667 | A1 | 9/2004 | Beda et al. |
| 2004/0189669 | A1 | 9/2004 | David et al. |
| 2004/0194020 | A1 | 9/2004 | Beda et al. |
| 2004/0223009 | A1 | 11/2004 | Szladovics et al. |
| 2004/0225491 | A1 | 11/2004 | Chang |
| 2005/0146533 | A1 | 7/2005 | Sanborn et al. |
| 2005/0216895 | A1 | 9/2005 | Tran |
| 2005/0268216 | A1 | 12/2005 | Hayes et al. |
| 2006/0010246 | A1 | 1/2006 | Schulz et al. |
| 2006/0026526 | A1 | 2/2006 | Simister et al. |
| 2006/0048051 | A1 | 3/2006 | Lazaridis |
| 2006/0103665 | A1 | 5/2006 | Opala et al. |
| 2006/0112167 | A1 | 5/2006 | Steele et al. |
| 2006/0123360 | A1 | 6/2006 | Anwar et al. |
| 2006/0152511 | A1 | 7/2006 | Whatmough |
| 2007/0013697 | A1 | 1/2007 | Gilboa |
| 2007/0089048 | A1 | 4/2007 | Lacey et al. |
| 2007/0094672 | A1 | 4/2007 | Hayton et al. |
| 2007/0113237 | A1 | 5/2007 | Hickson |
| 2007/0192818 | A1 | 8/2007 | Bourges-Sevenier et al. |
| 2007/0198918 | A1 | 8/2007 | Mor |
| 2007/0256055 | A1 | 11/2007 | Herscu |
| 2007/0288855 | A1 | 12/2007 | Rohrabaugh et al. |
| 2008/0082907 | A1 | 4/2008 | Sorotokin et al. |
| 2008/0127170 | A1 | 5/2008 | Goldman et al. |
| 2008/0134058 | A1* | 6/2008 | Shen et al. ............... 715/760 |

OTHER PUBLICATIONS

Ralston, A.; Reilly, E.D.; Hemmendinger, D., "Encyclopedia of Computer Science", 4th Ed. (2000), Nature Publishing Group, pp. 1391-1396, 1414-1417.*

Chambers, M.; Dixon, R.; Swartz, J., "Apollo for Adobe Flex Developers: Pocket Guide", (Mar. 2007), O'Reilly Media, Inc., pp. 1-121.*

Flanagan, D., "JavaScript: The Definitive Guide", 5th Ed. (Aug. 2006), O'Reilly Media, Inc., pp. 263-264, 582-591.*

Ajaxian.com, "Adobe Announces a Flex/Ajax Bridge", (Mar. 7, 2006), [retrieved from http://ajaxian.com/archives/adobe-announces-a-flex-ajax-bridge on Nov. 1, 2011].*

Berkovitz, J., "An ActionScript interpreter, courtesy of JavaScript and Apollo", (Apr. 12, 2007),[retrieved from http://joeberkovitz.com/blog/2007/04/12/an-actionscript-interpreter-courtesy-of-javascript-and-apollo/ on Nov. 1, 2011].*

Taft, D., "Adobe Bridges Flash, Flex with AJAX", (Mar. 8th, 2006), [retrieved from http://www.eweek.com/index2.php?option=content& task=view&id=898&pop=1&hide_ads=1&page=0&hide_js=1&catid=13 on Nov. 1, 2011].*

Aitken, "An Introductory Look at Windows Presentation Foundation: Part 1", downloaded from the internet on Sep. 6, 2006 at http://www.devsource.com/article2/0,1895,1965448,00.asp, May 21, 2006, 2 pages.

"An Introductory Look at Windows Presentation Foundation: Part 1, Getting the Beta Tools", downloaded from the internet on Sep. 6, 2006 at http://www.devsource.com/article2/0,1895,1965449,00.asp, 4 pages.

"An Introductory Look at Windows Presentation Foundation: Part 1, Layout Containers", downloaded from the internet on Sep. 6, 2006 at http://www.devsource.com/article2/0,1895,1965450,00.asp, 4 pages.

Bojanic, "The Joy of XUL", downloaded from the internet on Oct. 16, 2006 at http://developer.mozilla.org/en/docs/The_Joy_of_XUL, 5 pages.

Microsoft, "About the Browser", downloaded from the internet on Oct. 10, 2006 at http://msdn.microsoft.com/workshop/browser/overview/Overview.asp?frame=true, 2006, 6 pages.

Roberts, "Take Total Control of Internet Explorer with Advanced Hosting Interfaces", downloaded from the internet on Oct. 10, 2006 at http:/www.microsoft.com/mind/1098/advhost/advhost.asp, Oct. 1998, 9 pages.

"Windows Presentation Foundation", downloaded from the internet on Oct. 16, 2006 at http://msdn2.microsoft.com/en-us/netframework/aa663326(d=printer).aspx, 2006, 2 pages.

"XML User Interface Language (XUL) Project", downloaded from the internet on Oct. 16, 2006 at http://mozilla.org/projects/xul, 1 page.

Ajaxian.com, "Adobe Announces a Flex/Ajax Bridge", (Mar. 7, 2006), [retrieved from http://ajaxian.com/archives/adobe-announces-a-flex-ajax-bridge on Nov. 1, 2011] 5 pages.

Berkovitz, J., "An ActionScript interpreter, courtesy of JavaScript and Apollo", (Apr. 12, 2007),[retrieved from http://joeberkovitz.com/blog/2007/04/12/an-actionscript-interpreter-courtesy-of-javascript-and-apollo/ on Nov. 1, 2011] 3 pages.

Chambers, M.; Dixon, R.; Swartz, J., "Apollo for Adobe Flex Developers: Pocket Guide", (Mar. 2007), O'Reilly Media, Inc., 139 pages.

Flanagan, D., "JavaScript: The Definitive Guide", 5th Ed. (Aug. 2006), O'Reilly Media, Inc., pp. 263-264, 582-591 (14 pages).

Lott, J.; Schall, D.; Peters, K., "Action Script 3.0 Cookbook", (Oct. 11, 2006), O'Reilly Media, Inc., pp. 494-498 [retrieved from http://academic.safaribooksonline.com/book/programming/actionscript/0596526954 on Oct. 27, 2011] 14 pages.

Ralston, A.; Reilly, E.D.; Hemmendinger, D., "Encyclopedia of Computer Science", 4th Ed. (2000), Nature Publishing Group, pp. 1391-1396, 1414-1417 (12 pages).

Taft, D., "Adobe Bridges Flash, Flex with AJAX", (Mar. 8, 2006), [retrieved from http://www.eweek.com/index2.php?option=content& task=view&id=898&pop= 1 &hide_ads= 1 & page=O&hide..Js= 1 &catid= 13 on Nov. 1, 2011] 2 pages.

* cited by examiner

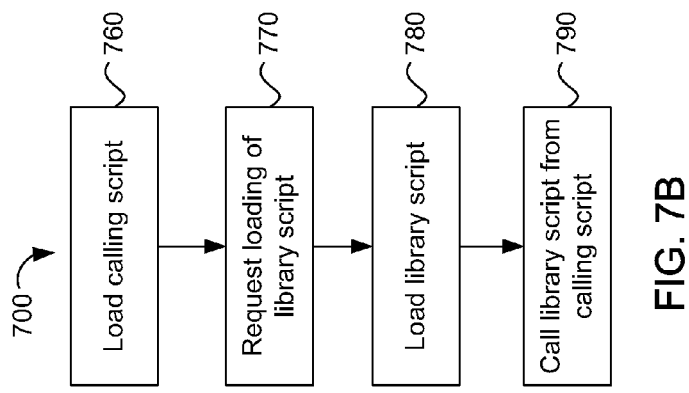
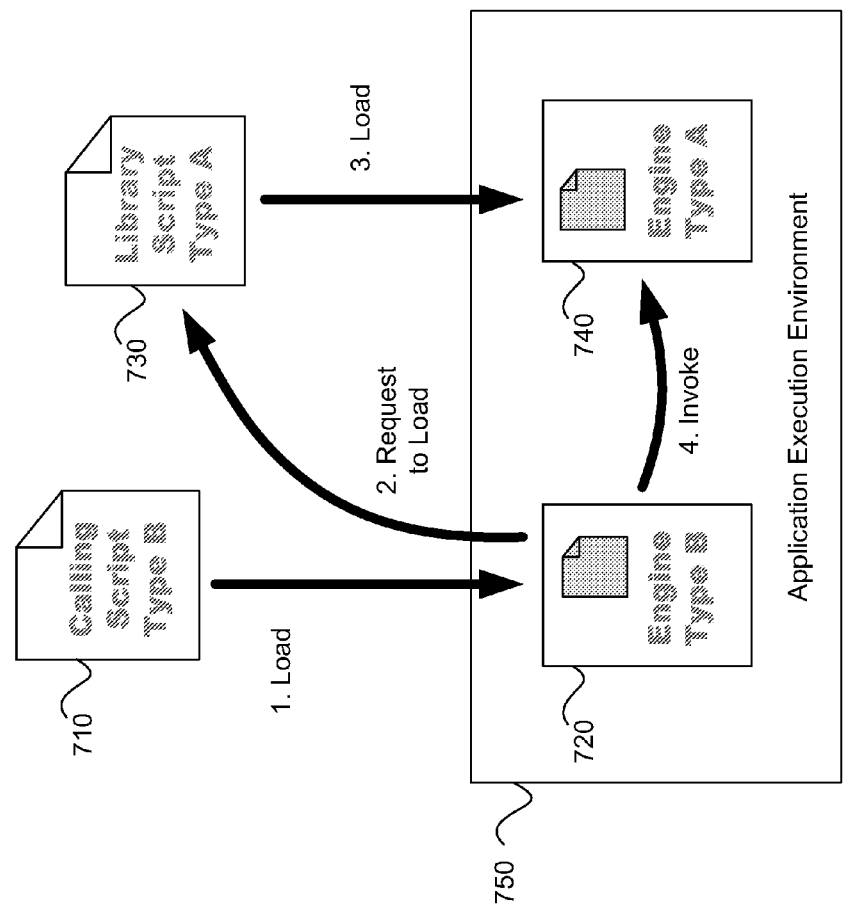
FIG. 7B
FIG. 7A

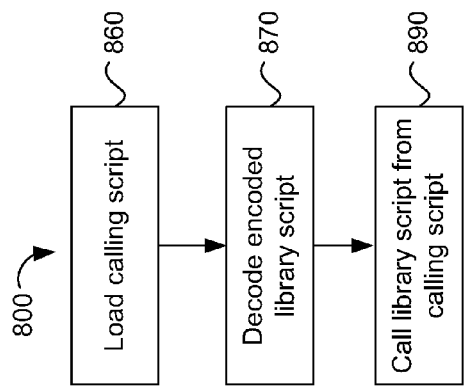
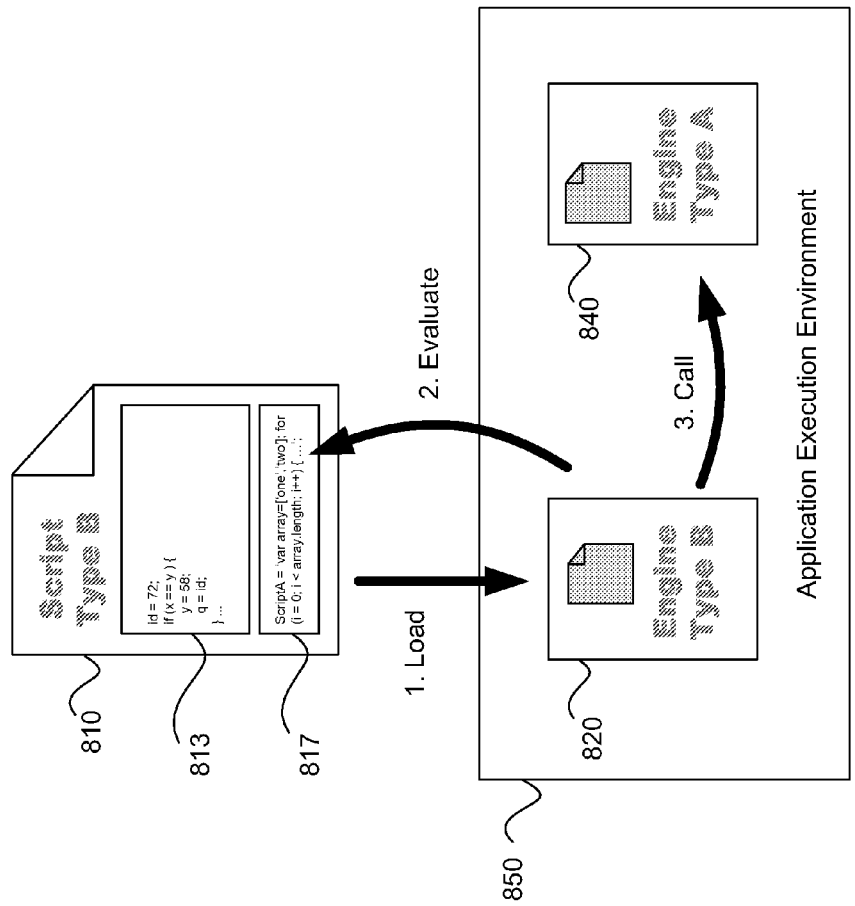

BRIDGING SCRIPT ENGINES

CROSS-REFERENCE TO RELATED APPLICATIONS

This application is a continuation-in-part of and claims the benefit of priority to U.S. patent application Ser. No. 11/585,661, now U.S. Pat. No. 7,614,003, entitled RENDERING HYPERTEXT MARKUP LANGUAGE CONTENT, to Christopher Brichford et al., filed on Oct. 23, 2006, which is related to U.S. patent application Ser. No. 11/512,764, now U.S. Publication No. 2008/0127170, entitled SOFTWARE INSTALLATION AND SUPPORT, to O. Goldman et al., filed on Aug. 29, 2006; and this application is related to U.S. patent application Ser. No. 11/773,924, now U.S. Pat. No. 8,020,089, entitled RENDERING HYPERTEXT MARKUP LANGUAGE CONTENT, to C. Brichford et al., filed on the same day as the present application; all of which are hereby incorporated by reference.

BACKGROUND

The present disclosure relates to the execution of scripts within scripting engines.

Many applications make use of a scripting engine so as to allow users to programmatically control an application through the use of a script. The script engine decodes and interprets the script as a series of instructions that are carried out when the script is run. A script engine is normally associated with a particular scripting language or script type. The associated script type refers to language that a script is specified in that the script engine can decode and run. For example, a JavaScript script engine is used to execute scripts that are specified using the JavaScript scripting language.

Some applications use multiple scripting engines where each engine is associated with a different script type. This allows a user to control such applications with scripts written in one of any of the script types supported by the multiple scripting engines. Generally, for each scripting engine used by an application, an interface is established between a scripting engine, in particular scripts running in the engine, and the application. Without such an interface a script running in the scripting engine would not be able to control the application or otherwise affect anything outside of the scripting engine.

SUMMARY

This specification describes technologies relating to the execution of scripts within scripting engines. In general, one or more aspects of the subject matter described in this specification can be embodied in one or more methods that include providing a first script engine to interpret scripts of a first script type; providing a second script engine to interpret scripts of a second script type; and bridging between the first script engine and the second script engine, wherein the bridging includes sharing identifiers defined for the first script engine with the second script engine, the sharing allowing scripts in the first script engine to refer to identifiers defined for the second script engine and scripts in the second script engine to refer to identifiers defined for the first script engine. Other embodiments of this aspect include corresponding systems, apparatus, and computer program products.

These and other embodiments can optionally include one or more of the following features. The method can include exposing a programming interface to a first script of the first script type interpreted by the first script engine, the first script engine using an application programming interface of a computer program to fulfill service requests made by the first script; and exposing the programming interface to a second script of the second script type interpreted by the second script engine, the second script engine using the first script engine to fulfill requests made by the second script to invoke services of the computer program. The programming interface can include one or more identifiers, each identifier in the one or more identifiers corresponding to a respective service, wherein exposing the programming interface to the first script includes: exposing the one or more identifiers to the first script, each one of the one or more identifiers being usable by the first script to invoke the corresponding service; and wherein exposing the programming interface to the second script includes: exposing the one or more identifiers to the second script, each one of the one or more identifiers being usable by the second script to invoke the corresponding service.

The one or more identifiers can refer to one or more of a named constant, a variable, a property, a method signature, an object or a class defined in the programming interface. The computer program can be an application execution environment. The application execution environment can include a hardware-platform-independent runtime library that provides services including local storage medium access, including a drag and drop service for use by applications running in the application execution environment, access to the local storage medium being provided through the programming interface.

The method can include providing a single script library to the first script and the second script, the script library defining a plurality of library identifiers, the plurality of library identifiers being usable by both the first script and the second script, the single script library being implemented as a script of the first script type, the second script type or a combination of the first and second script types. The method can include receiving a request from the second script to load the first script; loading the first script, the loading including exposing identifiers defined in the first script to the second script; and using the first script to fulfill a request by the second script, the request referring to at least one identifier defined in the first script. Moreover, loading the first script can include automatically decoding a string defined by the second script, the string encoding the first script.

The method can include maintaining a hierarchy of objects in the first script engine, the hierarchy of objects being exposed to the first script as a hierarchy of identifiers, an identifier in the hierarchy of identifiers being useable by the first script to address a corresponding object in the hierarchy of objects; and exposing the hierarchy of identifiers to the second script using a proxy identifier, the proxy identifier representing a root of the hierarchy of identifiers, the proxy identifier being usable by the second script to address the hierarchy of objects in the first script engine. Moreover, the method can include receiving an alternative identifier to use as the proxy identifier; disassociating the proxy identifier from the root of the hierarchy of identifiers, the proxy identifier being usable by the second script as a script-defined identifier; and associating the alternative identifier with the root of the hierarchy of identifiers, the alternative identifier being usable by the second script to address the hierarchy of objects in the first script engine.

Additionally, the method can include generating first objects for a first script of the first script type running in the first script engine, the first objects being referred to in the first script by respective first identifiers; exposing the first identifiers to a second script of the second type running in the second script engine, the first identifiers being usable by the second script to access the first objects; generating second objects for the second script, the second objects being referred to in the second script by respective second identifiers; and exposing the second identifiers to the first script, the second identifiers being usable by the first script to access the second objects.

Particular embodiments of the subject matter described in this specification can be implemented to realize one or more of the following advantages. A single programming interface for invoking services of a computer program can be exposed to the respective scripts running in multiple script engines without implementing separate connections between each script engine and the computer program. Since the same interface is exposed in all script types it is only necessary to understand the interface in one script type to use it in any of the supported script types. The single interface need only be documented once in a general fashion for it to be usable by programmers of any of the supported script types. As long as the interface is exposed in all script engines, the connective implementation between the computer program and a script engine need only be tested once for that particular script engine rather than tested separately for each script engine.

Script libraries can be implemented in one script type and used by other scripts of another script type. A script library need only be written once to be usable by scripts of more than one script type. Script developers can use the scripting language they are most familiar with; they don't have to learn a new script language to use the features of a runtime environment.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 7A shows how two scripts of different script types can be loaded into an application execution environment.

FIG. 7B shows an example process for using the functionality of one script from another.

FIG. 8A shows two scripts of different script types loaded from a single script.

FIG. 8B shows an example process for loading one script of one type from another script of another type.

Like reference numbers and designations in the various drawings indicate like elements.

DETAILED DESCRIPTION

Hypertext markup language (HTML) is an authoring language commonly used to create documents on the World Wide Web. HTML defines the structure and layout of a Web document using a variety of tags and attributes, which an HTML rendering engine interprets when processing HTML content. Typically, a Web browser employs an HTML rendering engine to render HTML content to a display device. In other cases, HTML content has been rendered statically to another format before display to a user, such as using the Web Capture feature in ADOBE ACROBAT® software provided by Adobe Systems Incorporated of San Jose, Calif.

In addition, the HTML rendering engine typically uses a document object model (DOM) when rendering HTML content, such as by using the DOM when rendering dynamic HTML (DHTML), to dynamically change the appearance of Web pages after they have been downloaded to the Web browser. The DOM maintains an internal document representation and implements the DOM application program interface (API). JavaScript embedded in (or referenced by) an HTML document can directly access the current document through the DOM API, and make changes or read the content.

A virtual machine (VM) is a self-contained operating environment that behaves as if it is a separate computer. For example, JAVA® applets run in a JAVA® Virtual Machine (JVM) (available from Sun Microsystems, Inc.), which has been implemented for many different computer platforms. The JVM provides a runtime environment and Java interpreter for most operating systems, including WINDOWS® OS, MAC® OS, AND LINUX® OS. Moreover, the JVM has been implemented as a Web browser plug-in.

Flash® Player (available from Adobe Systems Incorporated) is another virtual machine, which is used to run, or parse, Shockwave Flash (SWF). The Flash® Player has also been implemented as a Web browser plug-in. Thus, HTML content that is rendered by a Web browser can include SWF data.

Figure 1:
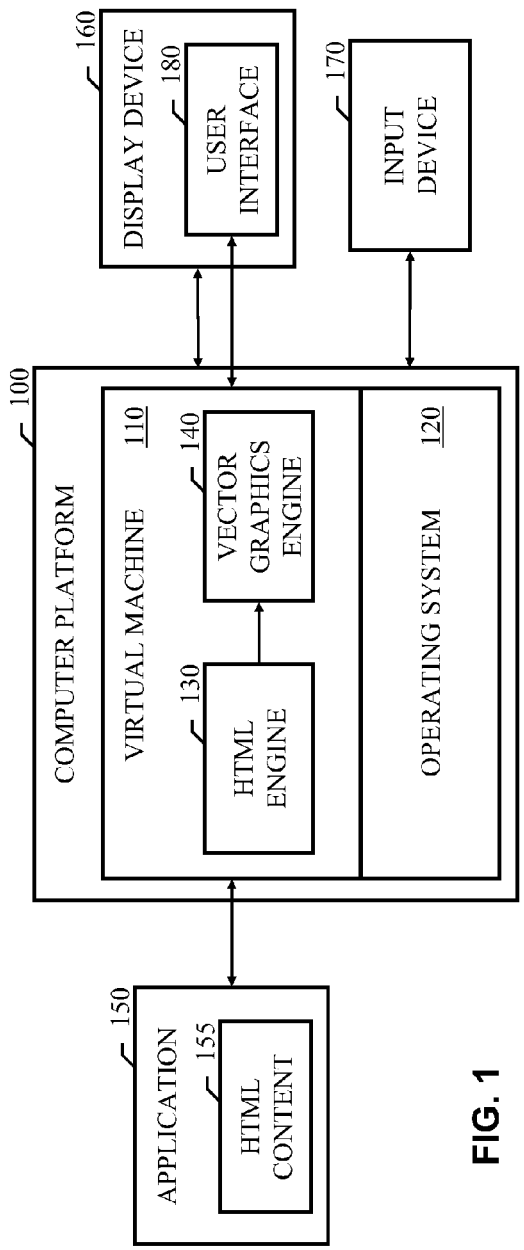
FIG. 1 shows an example system including a virtual machine serving as a software platform for application software.

FIG. 1 shows an example system including a virtual machine serving as a software platform for application software. A computer platform 100 is a data processing apparatus, with appropriate hardware, that includes a particular operating system (OS) 120 for that data processing apparatus (e.g., WINDOWS® OS, MAC® OS, or LINUX® OS). The computer platform 100 includes virtual machine 110. The virtual machine 110 is a runtime environment that provides software services for processes or programs while a computer is running. The virtual machine 110 can include (or be considered one and the same with) a runtime library, which is a collection of utility functions that support a program while it is running, often working with the OS 120 to provide facilities. The virtual machine 110 can be client-based software that runs Flash® applications, supports vector and raster graphics, bidirectional streaming of audio and video and one or more scripting languages (e.g., JavaScript and ActionScript). Moreover, the virtual machine 110 can deeply integrate Flash® applications with the OS, providing services such as file system access, multiple windows, running in the background, etc.

An application 150 can rely on the runtime library to operate; for example, an application 150 can be a Flash® application that uses SWF and runs on a computer using a client-based runtime library that runs Flash® applications separately from a web browser, whether online or offline. As used herein, an "application" refers to a computer program that the user perceives as a distinct computer tool used for a defined purpose. While the application 150 can be dependent on the virtual machine 110 to operate on the computer platform 100, the application 150 can also control its appearance and can run on the computer platform 100 even when not connected to a network. Thus, the application 150 can be viewed as a desktop application within the computer platform 100, even though the application 150 can run on the virtual machine 110 and thereby be platform independent.

The application 150 includes hypertext markup language (HTML) content 155 that is used in generating a user interface 180 for the application 150. Other code content can also be used to generate the user interface 180 by the application 150. For example, the application 150 can include SWF code used in generating the user interface 180, and the HTML content 155 can be included with the SWF code.

The virtual machine 110 can include an HTML rendering engine 130 and a vector graphics rendering engine 140, which interact to present the user interface 180 on a display device 160, and to update the user interface 180 based on input events received via the user interface 180 in combination with an input device 170. The operating system 120 can receive input events from the input device 170 and pass these input events to the virtual machine 110. The virtual machine 110 can give those events to the code that includes the vector graphics rendering engine 140, which can in turn pass those events to the HTML rendering engine 130 as appropriate.

The display device 160 can include a CRT (cathode ray tube) or LCD (liquid crystal display) monitor, for displaying information to a user, and the input device 170 can include a keyboard and a pointing device (e.g., a mouse or a trackball) by which the user can provide input to the system. It should be appreciated that the computer platform 100, the display device 160 and the input device 170 can together be included in a single system or device, such as a personal computer, a mobile telephone, a personal digital assistant (PDA), a mobile audio player, a Global Positioning System (GPS) receiver, to name just a few.

The HTML content 155 can be made interactive for a user in a variety of manners. The HTML content 155 can include DHTML, can include script (e.g., JavaScript), can include CSS (Cascading Style Sheets), or can include some combination of them. The HTML engine 130 can render the interactive HTML content 155 to primitives of the vector graphics engine 140. These primitives can include vector graphics (e.g., rectangles, ovals and fonts) and also raster graphics (e.g., a bitmap or Portable Network Graphics (PNG) image). As will be appreciated, raster graphics are distinct from vector graphics in that vector graphics represent an image using geometric objects such as curves and polygons, whereas raster graphics represent an image using a grid of pixels. Nonetheless, the primitives supported by the vector graphics rendering engine 140 can include both vector graphics and raster graphics.

The HTML engine 130 can also forward requests for external resources (images, frames, style sheets, scripts, etc.) to the vector graphics engine 140 or a related component of the virtual machine 110. This can be done to address security issues, which are addressed in detail below, and also to improve the end user's experience. For example, when the application 150 connects to a secure site on a network (e.g., the Internet), and the user of the application 150 typically will have to type in a password. If the HTML engine 130 connects to the network in a different manner than the vector graphics engine 140, the user might be forced to type in her password twice to get access to both HTML content and native content of the vector graphics engine 140. However, by forwarding resource requests from the HTML engine 130 into the vector graphics engine 140 (or the related component), the entered password can be tracked and the user need only type in her password once.

The virtual machine 110 can employ a managed environment in which privileges granted to the application 150 can be configured by a user or by a system administrator on a per-application basis. For example Application A running as User U may not be allowed to read or write files in "C:\Program Files", but Application B running as User U may be allowed to read files in "C:\Program Files". While these applications can run with higher privilege than web-based applications (e.g., they can read and write to the local disk), they can easily load content that should be prevented from using that high privilege. For example, a desktop application written in HTML can open a new window and load www-cnn-com into that new window. In such a case, the desktop application's HTML code can be permitted to read and write to local disk, while the HTML code from www-cnn-com can be prevented from reading or writing to local disk. This can be the default configuration for the virtual machine 110, but this configuration can also be changed, either by a user or system administrator, or by a mechanism through which code having a particular privilege level can confer that privilege level to other code (that otherwise does not have that privilege level) at runtime.

In addition, the vector graphics rendering engine 140 can employ a retained graphics mode in which the primitives that are rendered to a frame are kept track of for the lifetime of the frame. When the frame changes, the vector graphics rendering engine 140 need only modify and update the primitives that have a new state. For example, the vector graphics rendering engine 140 can be a Flash® rendering engine.

The retained graphics mode can be extended to the HTML rendering engine 130 such that the HTML engine 130 keeps track of the correlation between the HTML content 155 and the primitives rendered to the vector graphics rendering engine 140. When changes are then made in the HTML elements of the user interface 180 (e.g., because the mouse moved over a roll-over element or a menu element pops out), the HTML engine 130 need only regenerate and forward to the vector graphics engine 140 the corresponding primitives that are affected by the change. Thus, only those primitives that intersect the portion of the user interface affected by the change need be updated by the HTML rendering engine 130.

Figure 2:
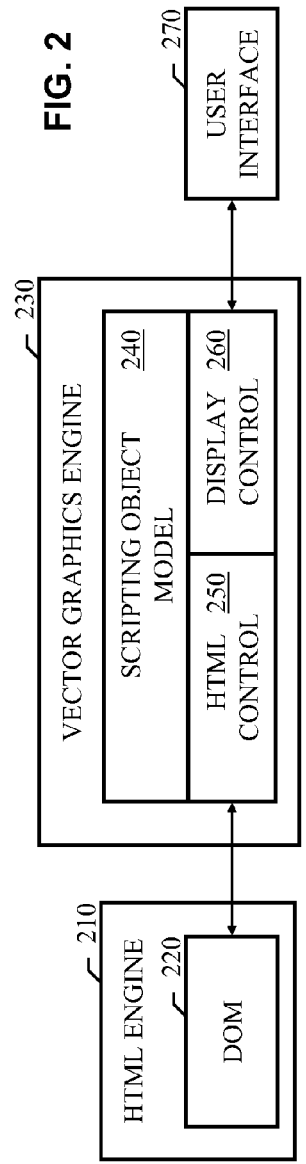
FIG. 2 shows example components of a hypertext markup language engine and a vector graphics engine that interact to present a user interface.

FIG. 2 shows example components of an HTML engine 210 and a vector graphics engine 230 that interact to present a user interface 270. The HTML engine 210 includes a DOM 220 for a given set of HTML content, which can include a script of a first script type (e.g., JavaScript). The vector graphics engine 230 includes an instance of a scripting object model 240 for a second script type (e.g., ActionScript). The scripting object model 240 includes a display control 260 that is used to generate the user interface 270. The display control 260 can be an instance of a display class in the scripting object model 240, which provides a basic display list building block: a display list node that can display graphics and can also contain children.

The display control 260 (DisplayObject) can be extended by an HTML control 250 (HTMLControl) that interfaces with the DOM 220. For example, an HTMLControl class can extend DisplayObject class and provide an application program interface (API) to the HTML functionality in the virtual machine 110. As an extension of the DisplayObject class, the HTMLControl class allows the HTMLControl class instance to be added to the display list once it is constructed as the child of any other DisplayObject instance that can have children.

The following description addresses the details for allowing a user of the HTMLControl class (e.g., the desktop application programmer) to implement various behaviors within the context of this class based scheme. However, it should be appreciated that other implementations are also possible. For example, an events based scheme can be employed. Events can have advantages in that it is generally simpler to hook up event handlers, and events can be handled by more than one listener. However, the event based approach can be problematic as the receivers of the events are often limited to communicating a single Boolean value, which indicates whether or not the dispatcher should perform some default logic after dispatching the event.

An interface based scheme can also be employed. Such a scheme can have advantages over an events based scheme since interfaces are generally more type safe than events, can readily return state, and only one handler is invoked (compared to events where any number of handlers can be registered for an event). However, an interface based scheme can require specification of a new class, while also potentially compromising backward compatibility in the event that additional methods are added to the interface at a later time.

In contrast, using subclassing, the needed behaviors can be implemented as overridable methods of a base class, HTMLHost. An instance of the HTMLControl class can reference an instance of the HTMLHost class or a subclass of the HTMLHost class. Allowing users of the HTMLControl class to create a subclass of the HTMLHost class and override some of its methods can provide most, if not all of the benefits of having an interface to implement the needed behaviors. If new behaviors are to be imeplemented by the HTMLHost class in the future, existing application code will not necessarily need to be changed. It is also possible that all of the behaviors of the window object and of the default DOM event handlers can be implemented as overridable methods of the HTMLHost.

The HTMLControl can allow first script type code (e.g., JavaScript) in the HTMLControl to hold references to, call methods on, and access properties of objects of the second script type. The HTMLControl can also allow second script type code (e.g., ActionScript) to hold references to, call methods on, and access properties of objects of the first script type code. For example, ActionScript can access the window object of the JavaScript running in the HTMLControl via a windowObject property; the ActionScript can then add properties to the window object whose values are references to ActionScript objects (including method closures).

The virtual machine's APIs exposed into the first script type object model can be second script type function closures that are bridged into the first script engine. Second script type code can also use the windowObject property to access the first script type object for the top level window object in the HTML contained by the HTMLControl. Second script type code can then set additional properties on the window object. Those additional properties can have values that are function closures that can be called from the first script type code. Those function closures can return second script type objects that get bridged into the first script engine. Script of the second type can instantiate script objects of the first type by finding the constructor for a first script type object in the window object of the HTMLControl.

The second type script can access the window object at anytime, however the HTMLControl's reference to the window object can be released, and a new window can be recreated shortly after or during any method that loads new content into the HTMLControl. A "complete" event can signal that all load-time processing of the HTML is complete and can also be a good time for second type script to manipulate the first type script object model. Moreover, anytime an HTML window object is referenced, a call can be made to a Security Manager to ensure the caller has permission to access the object model of the HTML window in question. Further example details of such bridging between a first script engine and a second script engine, while maintaining security model integrity, are described below in connection with FIG. 4.

Figure 3:
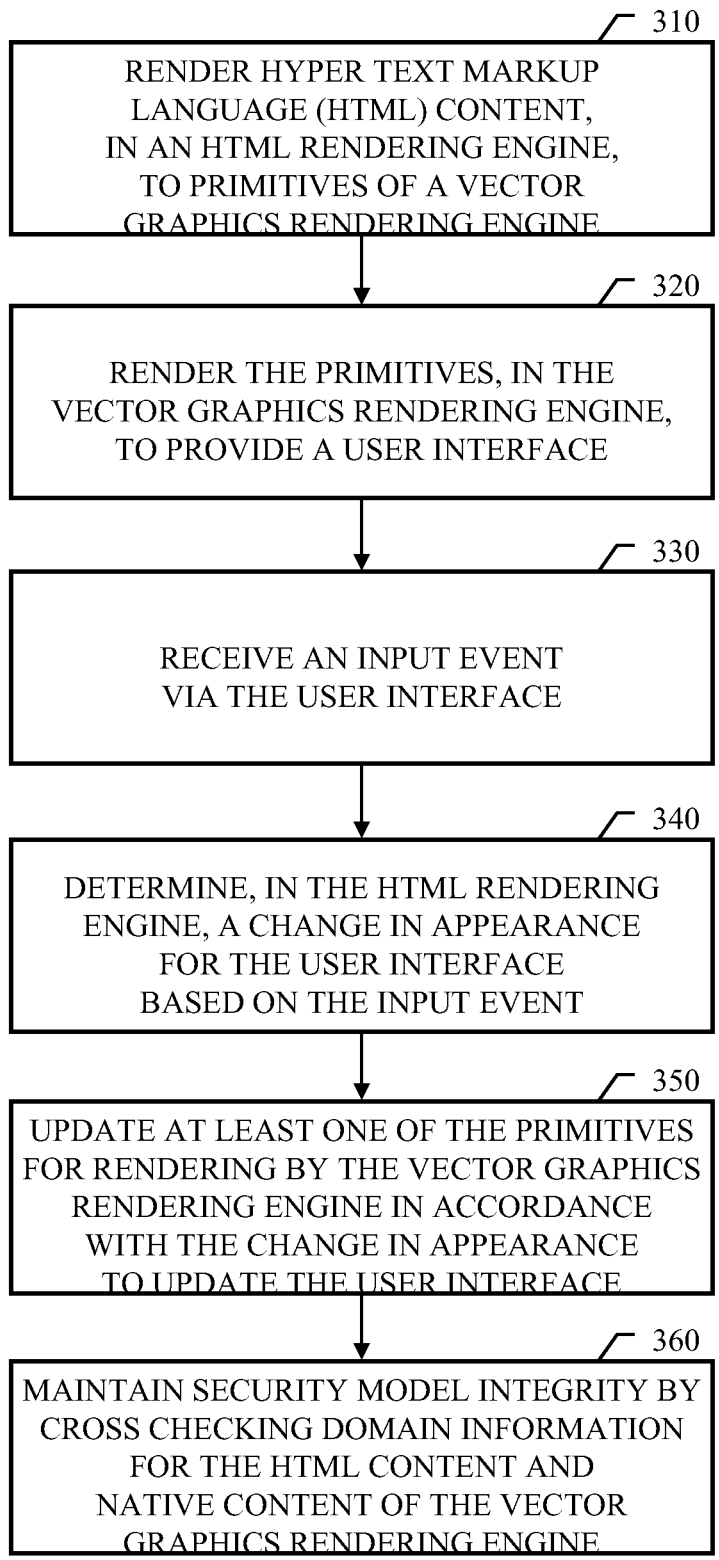
FIG. 3 shows an example process of rendering hypertext markup language content through a vector graphics rendering engine.

FIG. 3 shows an example process of rendering hypertext markup language content through a vector graphics rendering engine. HTML content can be rendered 310, in an HTML rendering engine, to primitives of a vector graphics rendering engine. This can involve rendering the HTML content to one or more raster images when raster graphics are included in the primitives of the vector graphics rendering engine. This can involve rendering the HTML content to vector graphics, which can result in crisper views and improved performance (e.g., for any video embedded inside the HTML content).

The primitives can be rendered 320, in the vector graphics rendering engine, to provide a user interface (UI). For example, the HTMLControl described above can be by default an embedded browser whose functionality is modeled after an HTML IFRAME element. An embedded browser is generally a superset of the functionality used to implement a container to render HTML as part of the UI of an application. Thus, the HTMLControl can be used to render an HTML UI through the vector graphics engine without subclassing the HTMLControl. If the default implementation of any of the HTMLControl's behaviors are not desired, then the HTML for the UI can be written not to exercise that behavior. For example, if the developer does not want the user to be able to navigate the control, then the developer can choose to write the HTML such that it contains no external links and no JavaScript calls to window.location, window.history.go, etc. If the developer wants more control, she can create a new subclass of an HTMLHost, which overrides methods that implement the various behaviors (such as what happens when a link is clicked on). She can then create an instance of the HTMLControl class and set the host property of the HTMLControl instance to reference an instance of the HTMLHost subclass she created.

An input event can be received 330 via the user interface. A change in appearance for the user interface can be determined 340, in the HTML rendering engine, based on the input event. At least one of the primitives can be updated 350 for rendering by the vector graphics rendering engine in accordance with the change in appearance to update the user interface. The determining can involve determining that the change in appearance affects only a portion of the user interface, and the updating can include updating only primitives that intersect the portion of the user interface affected by the change (e.g., only the vector graphic(s) affected by the change, or only the raster graphic region(s) of the user interface affected by the change).

The updating can be designed to regenerated as little of the user interface as possible to improve system performance. For example, for each primitive (e.g., rectangle, oval, image, etc.) sent to the vector graphics rendering engine by the HTML rendering engine, the HTML rendering engine can store a reference that is maintained until the user navigates away from the HTML content; and while changes are made to the user interface within the context of the HTML content, only the primitives affected by those changes need be updated.

For example, for every DOM node of the HTML content, a pointer can be attached to identify the one or more primitives that the given node generates. When the cursor in the UI moves on top of a UI element corresponding to a given DOM node (e.g., a DOM node that corresponds to a menu item), that DOM node receives an event. The DOM node can include JavaScript that effects a color change in response to that event, in which case, the primitive(s) that represent the given node can be located, the color updated, and the new primitive (s) can be sent to the vector graphics engine for rendering to the display. Alternatively, the UI can be implemented using a single primitive (a single raster image), which is then updated for any change in the UI.

In the context of the HTMLControl described above in connection with FIG. 2, the HTMLControl can defer the implementation of certain behaviors to the user of the HTMLControl. These behaviors can be either default event handlers for DOM events or implementations of properties and methods of the JavaScript object model. Users of the HTMLControl can implement these behaviors by subclassing the HTMLHost class, overriding second type script methods (eg. ActionScript methods) that correspond to the behaviors they want to control, and assigning the value of the host property of an HTMLControl instance to reference an instance of the subclass of HTMLHost they created.

When JavaScript in an HTML document does not handle a mouse or keyboard event, that event can be handled by a default event handler in the HTML engine. For things like a link, that default action may be to navigate to a new URL (Universal Resource Locator). The HTML engine used by the HTMLControl can decide when default actions are invoked. In the case of clicking on a link, the JavaScript onClick handlers can execute before the default handler executes, and the JavaScript onClick handlers can prevent the default hander from being invoked. If the HTML engine invokes the default handler, then a second type script method (e.g., an ActionScript method) on the HTMLHost can be invoked by the HTMLControl.

Similarly, if mouse down and mouse move on an image are not handled by JavaScript, the HTML engine can tell the virtual machine's drag manager to start a drag loop such that the image can be dragged on to the desktop or another application that accepts images. The HTMLControl can allow these default behaviors to be implemented in the second type scripting language (e.g., ActionScript) by the user of the HTMLControl.

When the default handlers have been invoked, the event can have already been through a bubble phase inside of the HTML content. By default all bubbling events can bubble out of the HTMLControl subject to security checks, such as described further below. A bubbling event can bubble through each display list object, but the event handlers on each display list object need only be invoked if those handlers have access to the object model of the target of the event. If a bubbling event bubbles out, the default behavior need not execute until the event has bubbled to the top of the display list. However, the default behavior handlers are not called if a preventDefault is called on the event object.

When the HTML Control receives an event during the capture phase, the HTMLControl can forward the event to the HTML DOM. At that point the HTML engine can find the DOM that contains the target of the event inside of the HTMLControl (i.e., the target DOM). The target DOM can be the DOM of an IFRAME element or a FRAME element. The HTML engine can then execute the capture, target, and bubble phases through the target DOM. The target phase can result in the event being forwarded to another DisplayObject tree in which the capture, target, and bubble phases are run. After the bubble phase in the target DOM has completed the event, the capture phase of the event in the display list that contains the HTMLControl can be complete. If the event bubbled out of the target DOM in the HTMLControl, the HTMLControl can then allow the event to bubble out of the HTMLControl and up the display list that contains the HTMLControl. Note that HTML does not generally allow JavaScript to capture or bubble events targeted at an element in an IFRAME element or FRAME element.

Events (error events, abort events, and user defined events) originating in the HTMLControl can bubble out of the HTMLControl if they bubble through the HTML DOM. If a user of the HTMLControl never wants a certain type of event to bubble out of the HTMLControl, she can put the HTMLControl in a container that prevents events of that type from bubbling out of that container.

When HTML is the root content of a desktop application that relies on the virtual machine, the runtime can load preexisting code (e.g., a pre-canned SWF) that is part of the runtime. This code can instantiate a subclass of the HTMLHost that overrides the windowOpen, windowMoveTo, and windowResizeTo, and windowClass methods and set the value of the host property on an HTMLControl instance to reference the instance of the HTMLHost sublcass. These methods can be implemented to open a new window, move the window, and resize the window. This code can also enable the injection of all runtime APIs into the first script type (e.g., JavaScript) object model. The runtime APIs can be added to object modules of all IFRAME and FRAME elements that have the same origin domain as the root HTML file. The preexisting code can be assigned to the same Security Domain as the root HTML content. When first type script (e.g., JavaScript) in any frame invokes a runtime method, the runtime method can execute with the same privilege of any first type script (e.g., JavaScript) or second type script (e.g., ActionScript) originating from the same Security Domain as the root HTML content. Alternatively, the runtime method can execute with the least privilege of any first type script or second type script code on a stack. The runtime method itself can be in the Security Context of the runtime.

Security model integrity can be maintained 360 by cross checking domain information for the HTML content and native content of the vector graphics rendering engine. When implementing the ability to embed HTML content in native content of the vector graphics rendering engine (e.g., HTML embedded in Flash® content), the system should guard against screen shot types of attacks, where the author of the native content can get access to the embedded HTML content, even when not appropriate. This can be prevented by recording the domain of any visible resource referenced by the HTML (e.g., images, frames, the HTML itself, etc.). When the native content attempts to take a screen shot of the HTML, the runtime can check to make sure that the native content came from the same domain as all of the visible resources for the referenced HTML. If the native content comes from a different domain than any of the visible resources, then the screen shot operation can be prevented. Alternatively, the domain of all resources associated with the HTML can be recorded, including non-visible resources (e.g., external scripts, external style sheets, etc.).

Furthermore, in implementations employing a security context stack, the HTML engine can have an HTML security model that is implemented on top of the Security Manager for the virtual machine. Every image (img tags, background images, CSS background images, etc.) and HTML file (including IFRAMES and FRAMES) can have an assigned Security Context. JavaScript code can be assigned a Code Context that is in the same Security Context as the HTML file that included its definition (either inline or via an external reference). Whenever the JavaScript engine calls a JavaScript function in a different security context, the security context stack can be pushed.

Thus, the JavaScript execution can be fully integrated with the security model employed by the virtual machine. Same origin checks can be implemented in terms of the virtual machine's security model. The security checks in the HTML engine for cross frame scripting and XMLHTTPRequest can be modified to thunk to the virtual machine's security manager. The XMLHTTPRequest implementation can be modified to use the virtual machine's security manager to decide whether or not to allow a request to a specified URL to proceed. When JavaScript sets window.domain, the security manager can also be notified.

In addition, in implementations employing a security context stack, when any of the second script type overridable methods on the HTMLControl that implement parts of the first script type object model are called, the method can be made by default to run with the lowest privilege of any script code on the call stack. Note however, that the second type script implementing an overridable method can also choose to use the virtual machine's Security Manager to escalate its privilege to the level of the Security Context of which that method is a part. IFRAMES and FRAMES can have security context assigned to them based on their URL and the domain of that URL. Alternatively, if no security context stack is employed, the code implementing the HTMLHost methods can take care to do nothing dangerous on behalf of code of the first script type.

Figure 4:
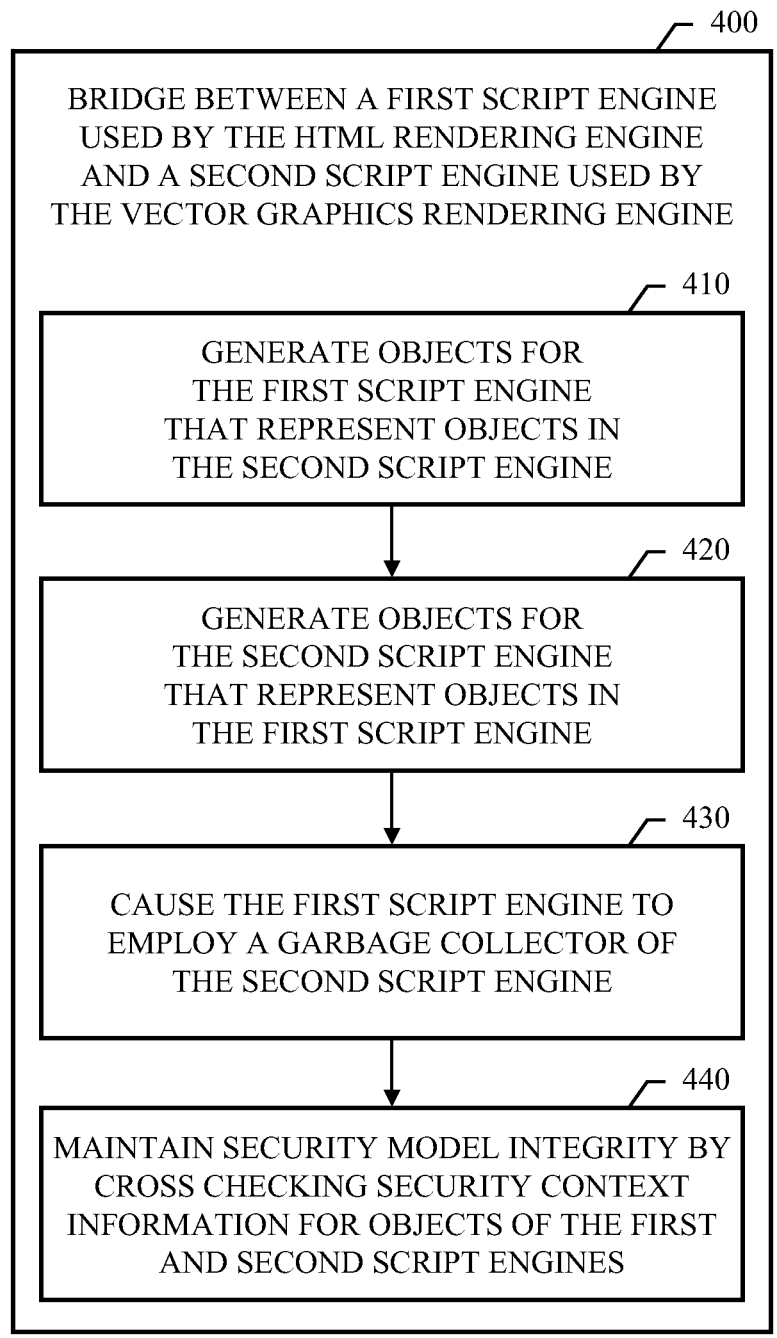
FIG. 4 shows an example process of bridging between a first script engine and a second script engine.

FIG. 4 shows an example process of bridging 400 between a first script engine (used by the HTML rendering engine) and a second script engine (used by the vector graphics rendering engine). Objects for the first script engine can be generated 410 that represent objects in the second script engine. Objects for the second script engine can be generated 420 that represent objects in the first script engine. The first script engine can be a JavaScript engine and the second script engine can be an ActionScript engine.

For example, an ActionScript function can have one or more arguments, and for each of these arguments, a JavaScript object can be created. Then, anytime a property is requested for that JavaScript object, or a method is called on that JavaScript object, the request can be forwarded back to the ActionScript object to which it corresponds.

Thus, a set of JavaScript objects can be created that represent all of the arguments to an ActionScript method. The system can call into the JavaScript engine to get the appropriate code and the function can be executed. As the function executes, when the function accesses a property or calls a method on an argument, this results in a transfer of control back to the ActionScript engine, where the results of those operations are obtained, wrapped with the JavaScript object(s) and handed back to the JavaScript engine. The converse operations can be performed when going from JavaScript into ActionScript. Thus, the system can use bridging objects between two different script engine, where the bridging objects represent objects in the other script engine.

The first script engine can be caused 430 to employ a garbage collector of the second script engine. Many scripting languages are "garbage collected", which means the script engine automatically identifies previously allocated memory that is no longer being used, and frees up that memory for future allocation (the garbage is collected). Typical garbage collectors operate by checking the program stack to find any memory objects that are no longer being referenced by the program (or by other objects that are referenced by objects referenced from the program stack), which thus indicates these memory objects (and any other object referenced by those objects) are garbage to be collected. Many garbage collectors use a mark and sweep algorithm. First they mark all the objects referenced by the stack. Then they mark all the objects referenced by marked objects. Once no more objects can be marked, all objects that are not marked are "garbage" and can be collected. After all the "garbage" has been collected, all the marked objects are unmarked. However, in the case of the use of bridging objects as described above, the two different script engines may not be able to see across the boundary spanned by the bridging objects, and thus the bridging objects may avoid being garbage collected. Note that the bridging objects can be implemented in C++ and exposed to the script engine as a script.

To address the garbage collection issue, one of the scripting engines (e.g., the JavaScript engine) can be changed to use the other scripting engine's garbage collector. Thus, every time the first script engine wants to create a new object, rather than allocate memory directly, the first script engine can request a memory allocation from the second script engine. The second script engine can employ a "conservative garbage collector", which is a garbage collector that finds references to objects by looking at all portions of the memory block allocated for an object to check for possible pointers (e.g., check every four bytes to see if it is a pointer to another object); since the objects in memory are known, the addresses are known and any potential object referencing pointer can be identified by the conservative garbage collector. By making the first script engine use a conservative garbage collector employed by the second script engine to allocate memory and to manage garbage collection, the bridging objects can be found and their memory freed up when it is no longer being used.

A script engine can be viewed as an interpreter that, in response to input, manipulates an object graph. Rather than having two object graphs for the two respective script engines, only a single object graph need be employed. The first script engine can be configured to use the object graph of the second script engine by interacting with the second script engine, and thus, the two script engines can be efficiently and effectively integrated.

Security model integrity can be maintained 440 by cross checking security context information for objects of the first and second script engines. The security context information can include domain information (e.g., Internet domain), transfer protocol information, and settings in the object's file. When bridging two script engines as described above, scripts of the second script type can hold references to, call methods on, and access properties of objects of the first script type, and vice versa. This can create an opening for scripting based attacks, which should be prevented.

Initially there are two references: a first object model and a second object model. The hosting content contains a reference to the global object of the hosted content and the hosted content has a reference to the object in the hosting content's object model that represents the hosted content. All other references to objects that cross the boundary between hosting and hosted content cannot exist until one of the original two references is used at least once. Whenever a script engine follows one of those original references, a security check can be performed. The security check can have various inputs, including the calls stack of the script attempting to use the reference, the domain of each frame of the call stack, the domain of the referenced object, system preferences, and user preferences. The security check can use these inputs to determine whether or not the script engine should allow that reference to be followed. The security check code may use all or some subset of its inputs to reach a decision. Thus, scripting based attacks can be prevented.

Figure 5:
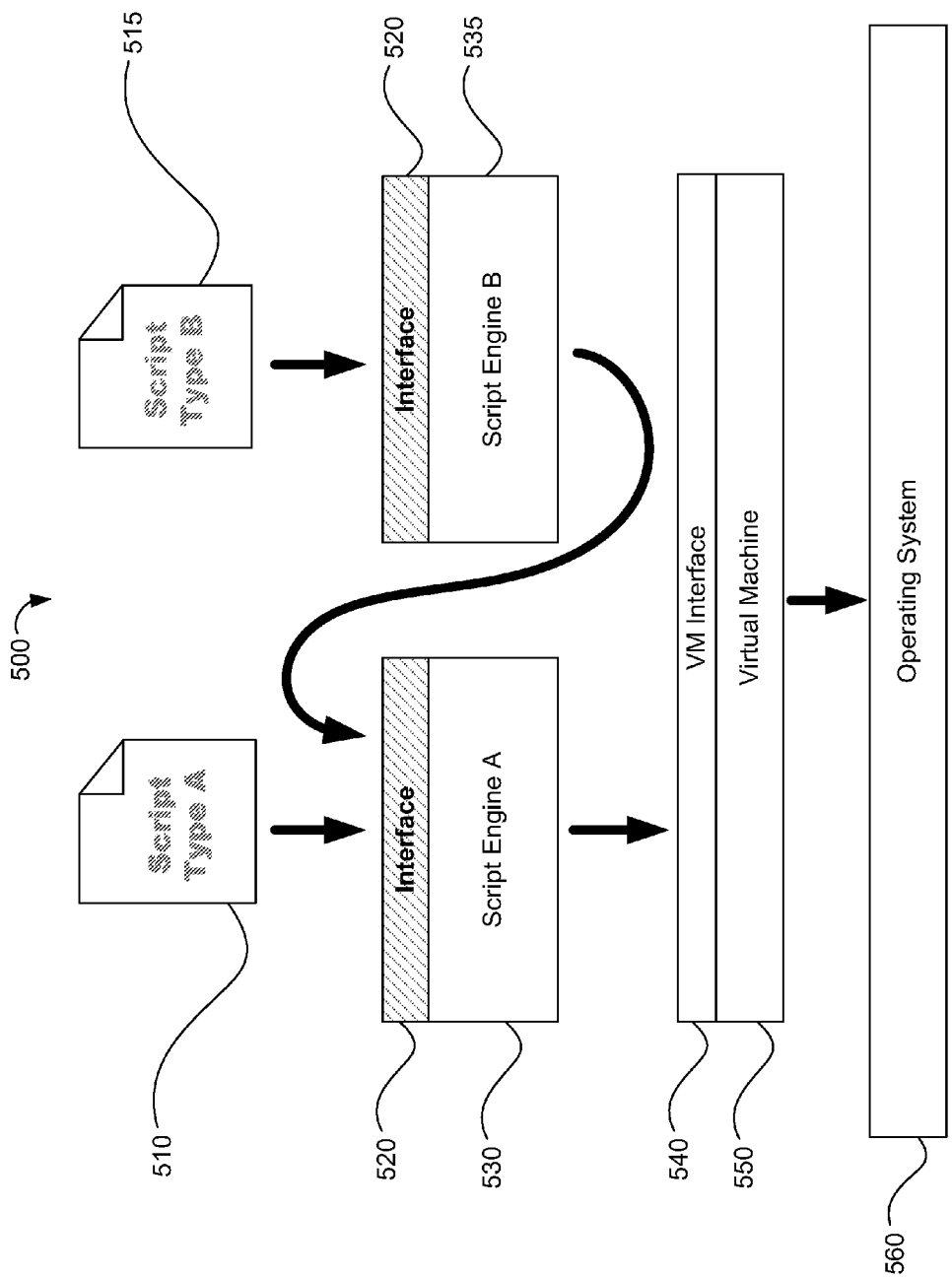
FIG. 5 shows how an example system where a programming interface is exposed to both a first script of a first script type and a second script of a second script type.

FIG. 5 shows how an example system 500 where a programming interface 520 is exposed to both a first script 510 of a first script type and a second script 515 of a second script type. For example, the first script 510, of a first script type (e.g., ActionScript), is run in a first script engine 530 of the corresponding type. Generally, a particular script engine is able to decode and execute scripts of a particular script type. So, for example, the second script 515, of a second script type (e.g., JavaScript), is run in a second script engine 535 of the second script type. A script engine can include a decoder, an interpreter, a compiler or some combination thereof for loading, interpreting and running scripts of a particular type. The script engine manages execution of the scripts and can associate script-specific state information (e.g., a data segment, a stack and device abstractions) for each script running within the script engine. The system 500 is an example of a system where one scripting engine is bridged with another scripting engine.

When an interface is exposed to a script, the script can refer to and invoke identifiers defined by the interface. The identifiers are used by the script to access services provided by the script engine in which the script is running. In some implementations, an identifier in the interface refers to method signatures, classes, instantiated objects (e.g., global objects or objects provided by the script engine), named constants, variables, method properties and method members. In other implementations, identifiers can refer to other entities such as registers, structures, enumerations, procedures, or subroutines. In any case, by referring to an identifier a script can accesses data (e.g., memory values and constants) or invoke a service (e.g., the functionality represented by a particular method or function) that is fulfilled by the script engine.

In some implementations, the script engine provides an interface for accessing data and invoking services outside of the scripting engine. For example, through the script engine, a script can be allowed to access information and services provided by another program (e.g., a virtual machine 550). Without such access a script running in the script engine would not otherwise have a means to generate tangible results outside of the script engine (e.g., affect what is being displayed on a display device, print to a printer or write a file to a disk). To fulfill requests from a script, a script engine can be said to directly use the other program. The script engine uses an interface 540 or API provided by the virtual machine 550 to invoke services on behalf of scripts running in the script engine. The interface exposed to scripts allows the scripts to use services provided by the API of the virtual machine. The scripts use of theses services by requesting service from the script engine. In response to such a request, the script engine uses the underlying virtual machine 550 to fulfill the request. Through the exposure of the interface, a script engine is effectively an abstraction mechanism for interacting with the virtual machine 550.

For example, the script 510 can invoke a method for opening a file on a non-volatile memory device. The method is invoked by the script using an identifier defined by the interface 520 of the script engine 530 in which the script is running. The script engine 530 can request service of the virtual machine 550 through the virtual machine interface 540. For example, the script engine can first use the virtual machine 550 to determine that no such file exists and then use the virtual machine 550 to create a file. In some implementations, the virtual machine can in turn use the services of another component of the system such as the operating system 560.

Just as the first script engine 530 receives requests by scripts running in the first script engine 530, the second script engine 535 receives requests by scripts (e.g., script 515) running in the second script engine 535. The same interface 520 can be exposed to scripts running in the second script engine 535. This allows scripts of the second script type to access exactly the same services available to scripts of the first script type. In contrast to the first script engine 530, however, when the second scripting engine 535 fulfills requests for the services of the same virtual machine 550, the second scripting engine 535 need not use the virtual machine 550 directly. Instead, for a given request by a script 515 using the interface 520, the second script engine 535 invokes the corresponding service of the first script engine 530. In response, the first script engine 530 fulfills the request using the virtual machine 550, as describe above. In effect, the second scripting engine 535 directly uses the first scripting engine 530 rather than directly using the virtual machine 550. Using the same interface 520 for both scripting engines ensures that one scripting engine can easily map services requests to the other script engine without having to develop separate implementations connecting each engine directly to the virtual machine.

Figure 6:
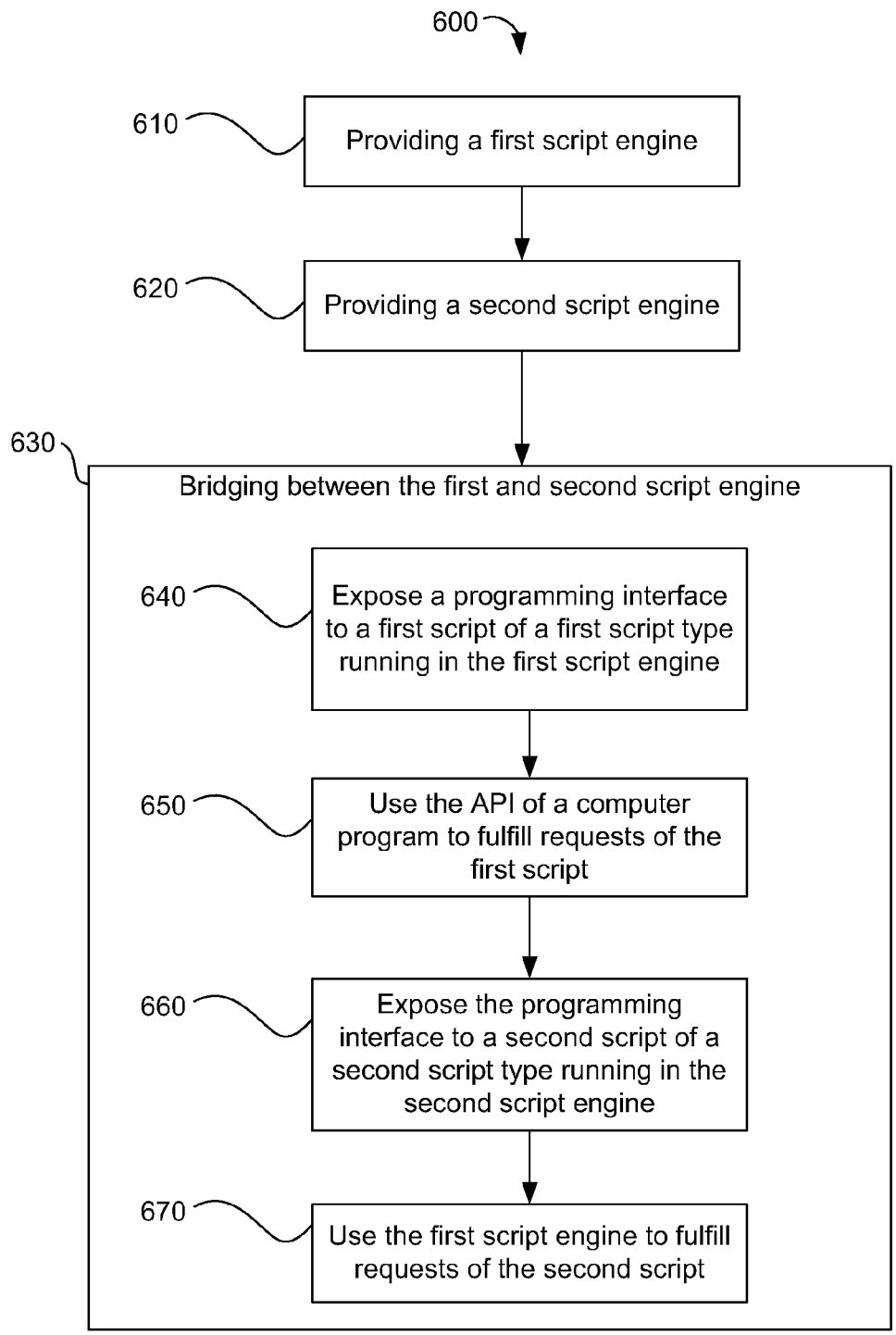
FIG. 6 is a flow diagram of an example process for exposing the same programming interface in multiple scripting engines.

FIG. 6 is a flow diagram of an example process 600 for exposing the same programming interface in multiple scripting engines. For convenience, the process 600 will be described with reference to a system that performs the process 600, such as the example system 500. In some implementations the system performing the process 600 is an application execution environment. An application execution environment is a virtualization environment that works in conjunction with native services (e.g., an operating system) of a data processing apparatus to provide a consistent well-defined environment in which scripts can be loaded and executed. The application execution environment can include the virtual machine 550. The system can include facilities such as memory management (e.g., garbage collection), standard libraries, media decoders, user interface frameworks and input-output interfaces. A script designed to run within such a system can often be developed rapidly because developers can rely on the consistency of the environment—even if the environment itself exists on widely varying hardware platforms. The application execution environment can be a plug-in to a web browser or a stand alone software program. The application execution environment can be a hardware-platform-independent runtime library that provides services. These services can include providing access to a local storage medium, a drag and drop service for use by applications running in the application execution environment etc. Access to services of the application execution environment is provided through the programming interface.

The system provides 610 a first scripting engine for running scripts of a first type and provides 620 a second scripting engine for running scripts of a second type. By providing a scripting engine of a particular type the system 600 can read, load and execute any scripts of the particular type. In some implementations, scripts are encoded files containing byte-code or other instructions that are not necessarily human-readable but can be executed by the system. Alternatively, scripts are human-readable. For example, each script can correspond to one or more files that contain source code that is readable to practitioners familiar with the particular script type (e.g., language) in which the script is specified. Such a script can be loaded (e.g., lexically and semantically parsed) and interpreted according to the instructions represented by the source code of the script. In either case, executing the script causes state that is associated with the script to change as instructions of the script are carried out. The instructions can include references to identifiers defined by the scripting engine. A script refers to the identifiers when accessing or invoking services that are provided by the scripting engine. Some or all of the services provided by the scripting engine can in turn be fulfilled using other programs or system components (e.g., a virtual machine or application execution environment).

The system bridges 630 between the first script engine and the second script engine. Bridging between two engines means that identifiers defined in one engine are made available to the other engine. Thus, a script running in the first engine can refer to identifiers defined for the second script engine, even if no such identifier is defined for the first script engine. Likewise, a script running in the second engine can refer to identifiers defined for the first script engine.

In some implementations, the system exposes 640 a programming interface to scripts of a first script type that run in the first script engine. The programming interface can be used by scripts running in the engine to invoke services provided by the engine. For example, in some implementations, the services can include access to file systems, user interface frameworks, display surfaces, audio generation, memory management, and others. The programming interface includes identifiers associated with particular services. A script requests service by referring to (e.g., in a call) the associated identifier. An API of a computer program (e.g., the virtualization environment) is used 650 to fulfill requests invoked by scripts running in the first script engine. For example, in response to a request to read a particular file in a file system, one or more services provided by a virtualization environment can be invoked to locate, open and read the requested file.

The programming interface is exposed 660 to scripts running in the second script engine. Thus, scripts running in the second engine can invoke the same services using the same identifiers as scripts running in the first engine. Even though the first script is of a first script type, and the second script is of a second distinct script type, both scripts can access services of the virtualization environment using the same interface. Although, in general, the syntax of first script type and the syntax of the second script type can differ, the identifiers used to invoke services are the same, even if the syntax used to specify the invocation differ between script types.

The system uses 670 the first script engine to fulfill requests of the second script running in the second script engine. Rather than fulfilling a request directly using the computer program, a corresponding service of the first script engine is invoked instead. Although the request is ultimately fulfilled by the virtualization environment, no connective implementation between the second script engine and the virtualization environment is required.

Note that services that are accessible from a script (e.g., can be invoked) need not be limited to those identified in the programming interface provided in the process 600. In some implementations, a scripting engine can additionally expose or provide other programming interfaces. These other programming interfaces may or may not have mirror equivalents in the other scripting engine and may or may not rely directly on the virtual machine to fulfill requests of these other programming interfaces. For example, the first scripting interface can expose a three-dimensional (3D) ray-tracing programming interface that a script can use to render three-dimensional scenes. Such a service can be provided by the first scripting engine without relying directly on services of the virtual machine—although the presentation of such a rendering may require services of the virtual machine. There may be no other equivalent programming interface or service provided by the second script engine. Instead, the second script engine can include another programming interface for, for example, accessing a multi-touch input device. To fulfill requests of such an interface the second script engine may well rely directly on service of the virtual machine (e.g., to access input data from the device). Neither of these example programming interfaces provided by each engine need be exposed to scripts running in their correspondingly reciprocal scripting engines. In other words, in this example, a script running in the first script engine can use the 3D programming interface to generate imagery while a script running in the second script engine cannot make use of the same services because the interface has not been exposed in the second script engine.

FIG. 7A shows how two scripts of different script types can be loaded into an application execution environment 750. In general, the author of a first script 710 may save significant time and effort by taking advantage of functionality specified in a second script 730. In such a situation, the second script can be considered a library to the first script; the first script is a calling script because it calls or invokes the functionality of the library. For example, the second script can include classes, functions or methods for encrypting data using a particular encryption scheme. The author of the first script can use the functionality of the second script even if the script type of the first script is not the same as the script type of the second script.

FIG. 7B shows an example process 700 for using the functionality of one script from another. The calling script is loaded 760 into the application execution environment 750. Since the calling script is of a particular script type, the script is run by a corresponding script engine 720. Once loaded, a request is made 770 to load the library script 730. In some implementations, the request is generated automatically as a part of the loading of the calling script. For example, the calling script can specify a list of scripts on which the calling script depends. In other implementations, the calling scripts can include instructions to explicitly request that the library script be loaded. The library script 730 is loaded 780 into the application execution environment 750. The library script is of another script type, different from the calling script and thus the library script is loaded and run by another script engine 740 distinct from the script engine 720 running the calling script. However, through the bridging between the script engines 720 and 740, the calling script 710 can invoke 790 services of the library script 730 by referring to identifiers defined in the library script. Note that, in general, the library script 730 can include multiple script types and therefore can be implemented in a first script type, a second script type or a combination of script types.

FIG. 8A shows two scripts of different script types loaded from a script specification 810. The script specification 810 specifies a script of a particular script type, for example, 10 the second script type. Similarly to other scripts, the script specification 810 includes a portion 813 specifying the instructions and data of the script. The script specification 810 also includes a portion 817 wherein another script of another script type is encoded as a string or sequence of bytes. In some implementations, for example, the string contains the source code of the second script type. In other implementations, the string contains an 15 encoding of the second script. For example, the sequence of bytes can specify a plain-text, binary or uuencoded representation of byte code of the second script. The portion 817 is compatible with the script type for the portion 813. The encoded sequence of bytes can be like any other sequence of bytes or data elements specified in the script specification 810. The encoded representation of the other script can be loaded into another script engine and called from the script specification 810.

FIG. 8B shows an example process 800 for loading one script of one type from another script of another type. For the sake of clarity, the script specification 810 can be considered the calling script while the script encoded within the script specification can be considered the library script. The script 810 is of a second script type while the encoded script is of a first script type. The script 810 is loaded 860 into the script engine 820, which is used for running scripts of the second script type.

The encoded portion script specified in the portion 817 of the script specification 810 is decoded 870. In some implementations, the encoded script can be identified automatically when the script specification 810 is loaded. For example, the script 810 can be associated with a dependencies list identifying a particular data element within the script 810 that is declared as an encoded script of a particular script type. In other implementations, the calling script, when run by the second script engine 820, can explicitly request that the data element specified in the portion 817 be decoded as a library script of the first script type. For example, the script specification 810 can use services provided by the script engine 820 for evaluating a particular data element as an encoded script of another script type. In either case, the encoded representation (e.g., the string or sequence of bytes) of the encoded script specified in the script specification 810 is provided to the other script engine 840. In some implementations, the representation is provided by the script engine 820 (e.g., when explicitly requested by the script specification 810) to the other script engine 840. In other implementations, the representation is provided by the application execution environment 850 (e.g., when the portion 817 is designated as another script). The other script engine 840 can decode and load the encoded representation of the encoded script just as the engine 840 would decode and load any other script. The script 840, running in the script engine 820 can call 890 services (e.g., functionality) defined in the encoded script.

Figure 9:
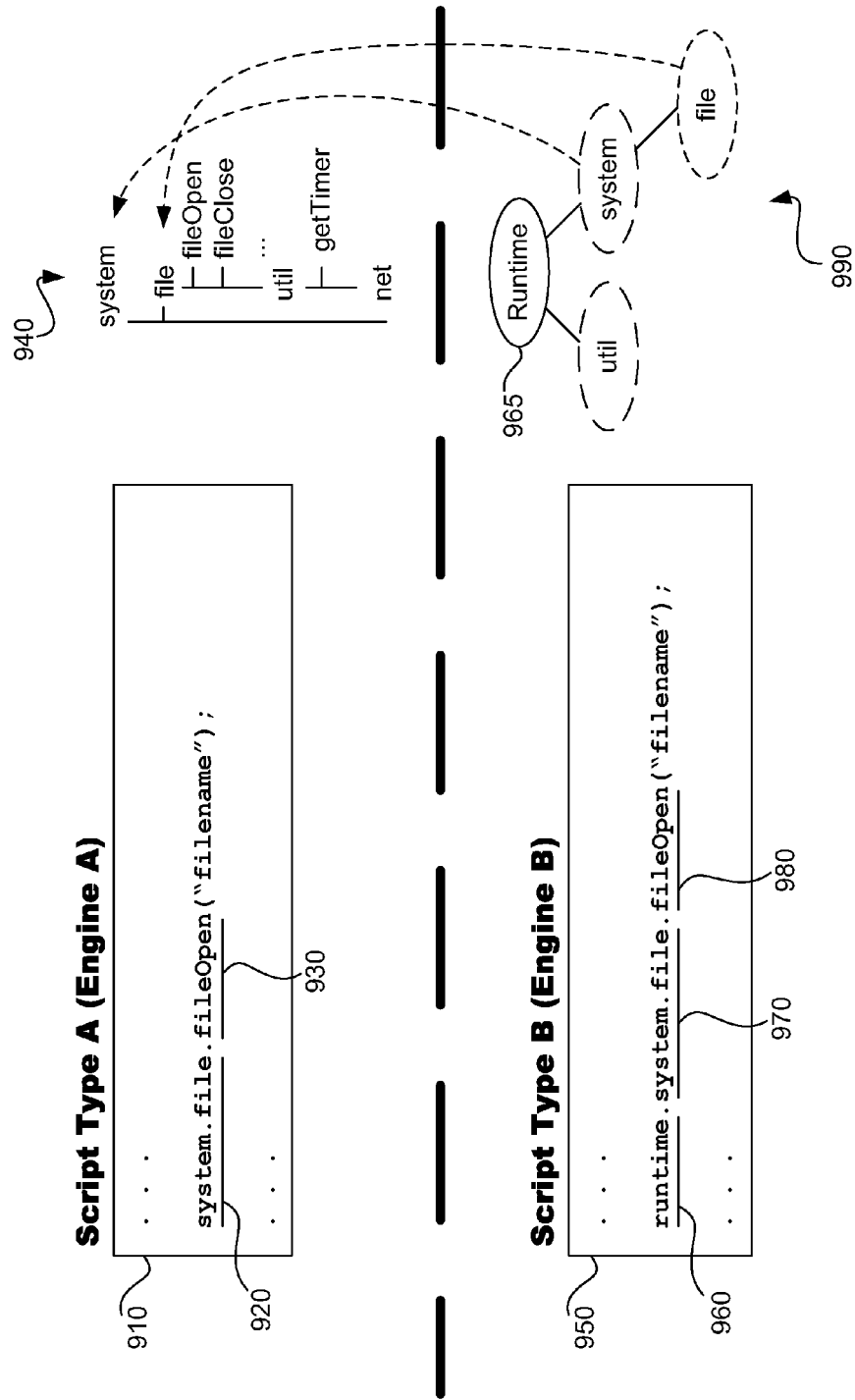
FIG. 9 shows how the same identifiers used in different scripting types are mapped between scripting engines.

FIG. 9 shows how the same identifiers used in different scripting types are mapped between scripting engines. In particular, a first source code snippet 910 from a first script of a first script type running in a first script engine includes a statement for invoking the service in the programming interface exposed to the first script. The example statement is a request to open a file called 'filename'. This particular statement is used as an example to illustrate how this and any other reference to the programming interface can be interpreted in two different scripting types no matter what particular service is being invoked.

The statement in the first code snippet 910 includes a qualifier 920 (e.g., 'system.file') used to identify a particular method, class, object or other entity which can be invoked (e.g., to request service) or referred to (e.g., to instantiate a class, access an object member or a declared variable). For example, the identifier 930 identifies a particular method called 'fileOpen'. The qualifier 920 specifies a particular path in a hierarchy of identifiers 940. The hierarchy of identifiers 940 is used to invoke service requests of the programming interface exposed by the script engine. In some implementations, the hierarchy of identifiers 940 corresponds to a package naming scheme in the first script engine whereby packages are arranged in a hierarchy of packages and sub-packages. Each package can include methods, classes, objects or other entities that can be used by a script. The qualifier 920 is specified so as to distinguish which entity in the hierarchy called 'fileOpen' the identifier 930 refers to. In other implementations, the hierarchy of identifiers 940 corresponds to a hierarchy of objects or class definitions. For example, in such an implementation, 'file' identifies particular static member of a 'system' class or a member of a 'system' object. Likewise, 'fileOpen' identifies a method in the 'file' class or object.

The same or substantially the same syntactic identification of services can be used in a second script of a second script type in a second script engine. A syntactic identification is substantially the same as another if the same identifiers are used to identify the same service (e.g., punctuation, operators and ordering of identifiers may differ). The source code snippet 950 shows the same service request invoked by a script of a second script type. As a part of the bridging between the two script engines an identifier 960 (e.g., 'runtime') can be used by the second script to access a service of the first script engine. In some implementations, the statement in the snippet 950 is interpreted as a hierarchy of data structure dereferences. For example, in the second script 'runtime' identifies a particular object having a member 'system' (e.g., a class or other data structure). The resultant class, 'system', is in turn dereferenced to access the member 'file'. In such implementations, the identifier 960 can correspond to a proxy object 965 in the second script engine.

The proxy object 965 can be exposed to the script in the second engine as a part of the bridging between the two script engines. When a script specifies the identifier 960 and a request for a particular member of the object by, for example, specifying the identifier 980. The proxy object is used to resolve the request. For example, in response to the request for the 'system' object of the 'runtime' object, another proxy object is dynamically created as the requested 'system' object. This system object is another proxy object and generally corresponds to the system package in the hierarchy 940. Thus, the system object can be used by the script to dereference other members such as the 'file' member. In response to such a request another proxy object, a file object is dynamically created. The hierarchy of identifiers that are usable in the first script engine can be made usable in the second script engine by dynamically creating proxy objects in the second script engine. Each proxy object is usable in the second script engine to access other proxy objects or to refer to the services exposed through the first script engine. The proxy objects that are dynamically created can themselves be considered a hierarchy of proxy objects 990 in the second script engine.

In general, in either script type, a series of identifiers is used to describe a particular path through a hierarchy (e.g., of objects 990, of packages 940 or of other hierarchical data structures). The last identifier specified in the path (i.e., the leaf of the hierarchy) specifies an entity being referenced by the script. For example, the method for opening a file is identified by the identifier 930 in the first script and by the same identifier 980 in the second script. The dynamic creation of proxy objects is used to afford use of the same syntactic qualifiers (e.g., the qualifier 930 in the first script and the qualifier 970 in the second script), even though each script may interpret the qualifiers differently owing to the fact that each script is of a different script type. For example, in the first script type the qualifier 930 is assumed to identify a path in hierarchy of packages while in the second script type the same qualifier 970 is assumed to identify a path in a hierarchy of objects.

In some implementations, the particular identifier (e.g., 'runtime') used to access the proxy object 965 can be disassociated with the proxy object 965 and associated with a different identifier. For example, the second script can be allowed to disassociate 'runtime' from the object 965 and instead associate with 'syscall', or any other identifier. Such facility can be useful if the second script has already used the identifier 'runtime' to refer to other entities (e.g., an object created by the second script). Thereafter, the second script can then invoke qualified services using the 'syscall' identifier instead of the 'runtime' identifier.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
providing a first script engine to interpret scripts of a first script type;
providing a second script engine to interpret scripts of a second script type;
bridging between the first script engine and the second script engine,
wherein the bridging comprises sharing identifiers defined for the first script engine with the second script engine, the sharing allowing scripts in the first script engine to refer to identifiers defined for the second script engine and scripts in the second script engine to refer to identifiers defined for the first script engine;
exposing a programming interface to a first script of the first script type interpreted by the first script engine, the first script engine using an application programming interface of a computer program to fulfill service requests made by the first script; and
exposing the programming interface to a second script of the second script type interpreted by the second script engine, the second script engine using the first script engine to fulfill requests made by the second script to invoke services of the computer program.

2. The method of claim 1, wherein the programming interface comprising one or more identifiers, each identifier in the one or more identifiers corresponding to a respective service, wherein exposing the programming interface to the first script further comprises:
exposing the one or more identifiers to the first script, each one of the one or more identifiers being usable by the first script to invoke the corresponding service; and
wherein exposing the programming interface to the second script further comprises:
exposing the one or more identifiers to the second script, each one of the one or more identifiers being usable by the second script to invoke the corresponding service.

3. The method of claim 2, wherein the one or more identifiers refer to one or more of a named constant, a variable, a property, a method signature, an object or a class defined in the programming interface.

4. The method of claim 1, wherein the computer program is an application execution environment.

5. The method of claim 4, wherein the application execution environment comprises a hardware-platform-independent runtime library that provides services comprising local storage medium access, including a drag and drop service for use by applications running in the application execution environment, access to the local storage medium being provided through the programming interface.

6. The method of claim 1, further comprising:
providing a single script library to the first script and the second script, the script library defining a plurality of library identifiers, the plurality of library identifiers being usable by both the first script and the second script, the single script library being implemented as a script of the first script type, the second script type or a combination of the first and second script types.

7. The method of claim 1, further comprising:
receiving a request from the second script to load the first script;
loading the first script, the loading including exposing identifiers defined in the first script to the second script; and
using the first script to fulfill a request by the second script, the request referring to at least one identifier defined in the first script.

8. The method of claim 7, wherein loading the first script further comprises:
automatically decoding a string defined by the second script, the string encoding the first script.

9. The method of claim 1, further comprising:
maintaining a hierarchy of objects in the first script engine, the hierarchy of objects being exposed to the first script as a hierarchy of identifiers, an identifier in the hierarchy of identifiers being useable by the first script to address a corresponding object in the hierarchy of objects; and
exposing the hierarchy of identifiers to the second script using a proxy identifier, the proxy identifier representing a root of the hierarchy of identifiers, the proxy identifier being usable by the second script to address the hierarchy of objects in the first script engine.

10. The method of claim 9, further comprising:
receiving an alternative identifier to use as the proxy identifier;
disassociating the proxy identifier from the root of the hierarchy of identifiers, the proxy identifier being usable by the second script as a script-defined identifier; and
associating the alternative identifier with the root of the hierarchy of identifiers, the alternative identifier being usable by the second script to address the hierarchy of objects in the first script engine.

11. The method of claim 1, further comprising:
generating first objects for the first script of the first script type running in the first script engine, the first objects being referred to in the first script by respective first identifiers;
exposing the first identifiers to the second script of the second type running in the second script engine, the first identifiers being usable by the second script to access the first objects;
generating second objects for the second script, the second objects being referred to in the second script by respective second identifiers; and
exposing the second identifiers to the first script, the second identifiers being usable by the first script to access the second objects.

12. A computer program product, encoded on a non-transitory computer-readable medium, operable to cause a data processing apparatus to perform operations comprising:
providing a first script engine to interpret scripts of a first script type;
providing a second script engine to interpret scripts of a second script type;
bridging between the first script engine and the second script engine, wherein the bridging comprises sharing identifiers defined for the first script engine with the second script engine, the sharing allowing scripts in the first script engine to refer to identifiers defined for the second script engine and scripts in the second script engine to refer to identifiers defined for the first script engine;

exposing a programming interface to a first script of the first script type interpreted by the first script engine, the first script engine using an application programming interface of a computer program to fulfill service requests made by the first script; and exposing the programming interface to a second script of the second script type interpreted by the second script engine, the second script engine using the first script engine to fulfill requests made by the second script to invoke services of the computer program.

13. The computer program product of claim 12, wherein the programming interface comprising one or more identifiers, each identifier in the one or more identifiers corresponding to a respective service, wherein exposing the programming interface to the first script further comprises:

exposing the one or more identifiers to the first script, each one of the one or more identifiers being usable by the first script to invoke the corresponding service; and wherein exposing the programming interface to the second script further comprises:

exposing the one or more identifiers to the second script, each one of the one or more identifiers being usable by the second script to invoke the corresponding service.

14. The computer program product of claim 13, wherein the one or more identifiers refer to one or more of a named constant, a variable, a property, a method signature, an object or a class defined in the programming interface.

15. The computer program product of claim 12, wherein the computer program is an application execution environment.

16. The computer program product of claim 15, wherein the application execution environment comprises a hardware-platform-independent runtime library that provides services comprising local storage medium access, including a drag and drop service for use by applications running in the application execution environment, access to the local storage medium being provided through the programming interface.

17. The computer program product of claim 12, the operations further comprising:

providing a single script library to the first script and the second script, the script library defining a plurality of library identifiers, the plurality of library identifiers being usable by both the first script and the second script, the single script library being implemented as a script of the first script type, the second script type or a combination of the first and second script types.

18. The computer program product of claim 12, the operations further comprising:

receiving a request from the second script to load the first script;

loading the first script, the loading including exposing identifiers defined in the first script to the second script; and using the first script to fulfill a request by the second script, the request referring to at least one identifier defined in the first script.

19. The computer program product of claim 18, wherein loading the first script further comprises:

automatically decoding a string defined by the second script, the string encoding the first script.

20. The computer program product of claim 12, the operations further comprising:

maintaining a hierarchy of objects in the first script engine, the hierarchy of objects being exposed to the first script as a hierarchy of identifiers, an identifier in the hierarchy of identifiers being useable by the first script to address a corresponding object in the hierarchy of objects; and exposing the hierarchy of identifiers to the second script using a proxy identifier, the proxy identifier representing a root of the hierarchy of identifiers, the proxy identifier being usable by the second script to address the hierarchy of objects in the first script engine.

21. The computer program product of claim 20, the operations further comprising:

receiving an alternative identifier to use as the proxy identifier;

disassociating the proxy identifier from the root of the hierarchy of identifiers, the proxy identifier being usable by the second script as a script-defined identifier; and associating the alternative identifier with the root of the hierarchy of identifiers, the alternative identifier being usable by the second script to address the hierarchy of objects in the first script engine.

22. The computer program product of claim 12, the operations further comprising:

generating first objects for the first script of the first script type running in the first script engine, the first objects being referred to in the first script by respective first identifiers;

exposing the first identifiers to the second script of the second type running in the second script engine, the first identifiers being usable by the second script to access the first objects;

generating second objects for the second script, the second objects being referred to in the second script by respective second identifiers; and exposing the second identifiers to the first script, the second identifiers being usable by the first script to access the second objects.

23. A system comprising:

a user interface device; and one or more computers operable to interact with the user interface device and to perform operations comprising:

providing a first script engine to interpret scripts of a first script type;

providing a second script engine to interpret scripts of a second script type;

bridging between the first script engine and the second script engine, wherein the bridging comprises sharing identifiers defined for the first script engine with the second script engine, the sharing allowing scripts in the first script engine to refer to identifiers defined for the second script engine and scripts in the second script engine to refer to identifiers defined for the first script engine;

exposing a programming interface to a first script of the first script type interpreted by the first script engine, the first script engine using an application programming interface of a computer program to fulfill service requests made by the first script; and exposing the programming interface to a second script of the second script type interpreted by the second script engine, the second script engine using the first script engine to fulfill requests made by the second script to invoke services of the computer program.

24. The system of claim 23, wherein the programming interface comprising one or more identifiers, each identifier in the one or more identifiers corresponding to a respective service, wherein exposing the programming interface to the first script further comprises:

exposing the one or more identifiers to the first script, each one of the one or more identifiers being usable by the first script to invoke the corresponding service; and wherein exposing the programming interface to the second script further comprises:
exposing the one or more identifiers to the second script, each one of the one or more identifiers being usable by the second script to invoke the corresponding service.

25. The system of claim 24, wherein the one or more identifiers refer to one or more of a named constant, a variable, a property, a method signature, an object or a class defined in the programming interface.

26. The system of claim 23, wherein the computer program is an application execution environment.

27. The system of claim 26, wherein the application execution environment comprises a hardware-platform-independent runtime library that provides services comprising local storage medium access, including a drag and drop service for use by applications running in the application execution environment, access to the local storage medium being provided through the programming interface.

28. The system of claim 23, the operations further comprising:
providing a single script library to the first script and the second script, the script library defining a plurality of library identifiers, the plurality of library identifiers being usable by both the first script and the second script, the single script library being implemented as a script of the first script type, the second script type or a combination of the first and second script types.

29. The system of claim 23, the operations further comprising:
receiving a request from the second script to load the first script;
loading the first script, the loading including exposing identifiers defined in the first script to the second script; and
using the first script to fulfill a request by the second script, the request referring to at least one identifier defined in the first script.

30. The system of claim 29, wherein loading the first script further comprises:
automatically decoding a string defined by the second script, the string encoding the first script.

31. The system of claim 23, the operations further comprising:
maintaining a hierarchy of objects in the first script engine, the hierarchy of objects being exposed to the first script as a hierarchy of identifiers, an identifier in the hierarchy of identifiers being useable by the first script to address a corresponding object in the hierarchy of objects; and
exposing the hierarchy of identifiers to the second script using a proxy identifier, the proxy identifier representing a root of the hierarchy of identifiers, the proxy identifier being usable by the second script to address the hierarchy of objects in the first script engine.

32. The system of claim 31, the operations further comprising:
receiving an alternative identifier to use as the proxy identifier;
disassociating the proxy identifier from the root of the hierarchy of identifiers, the proxy identifier being usable by the second script as a script-defined identifier; and
associating the alternative identifier with the root of the hierarchy of identifiers, the alternative identifier being usable by the second script to address the hierarchy of objects in the first script engine.

33. The system of claim 23, the operations further comprising:
generating first objects for the first script of the first script type running in the first script engine, the first objects being referred to in the first script by respective first identifiers;
exposing the first identifiers to the second script of the second type running in the second script engine, the first identifiers being usable by the second script to access the first objects;
generating second objects for the second script, the second objects being referred to in the second script by respective second identifiers; and
exposing the second identifiers to the first script, the second identifiers being usable by the first script to access the second objects.

34. The system of claim 23, wherein the one or more computers comprises one personal computer, and the personal computer comprises the user interface device.

* * * * *